July 26, 1966 R. H. PETRETTI 3,262,571
EDUCTION UNIT
Filed May 9, 1963 3 Sheets-Sheet 1
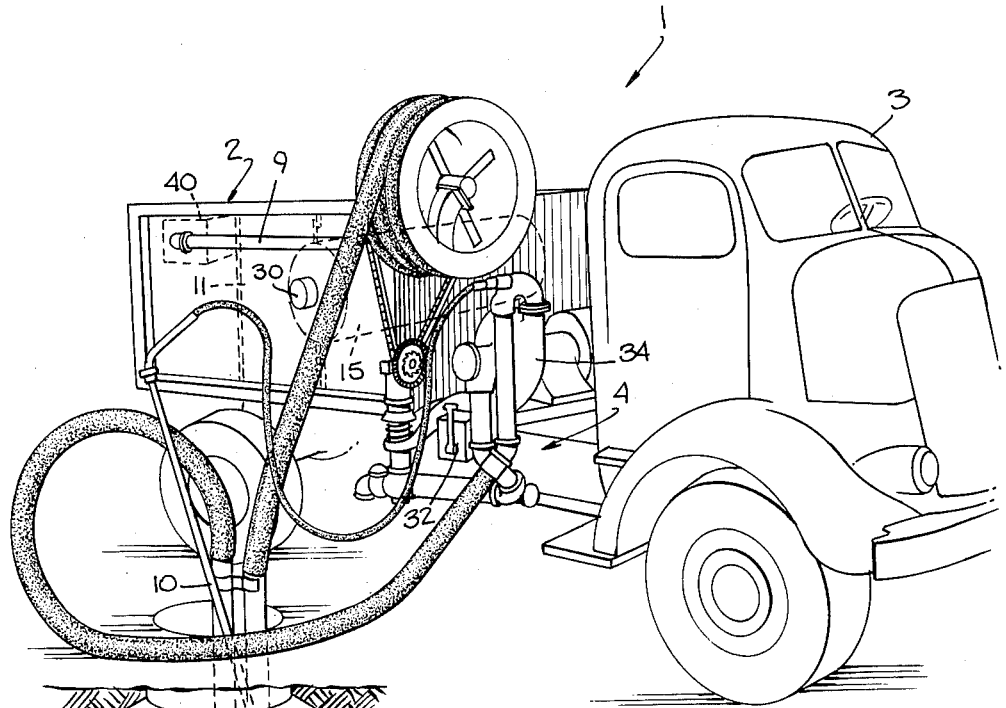
Fig.1.
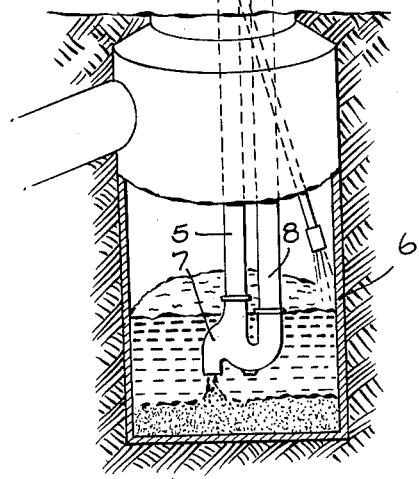
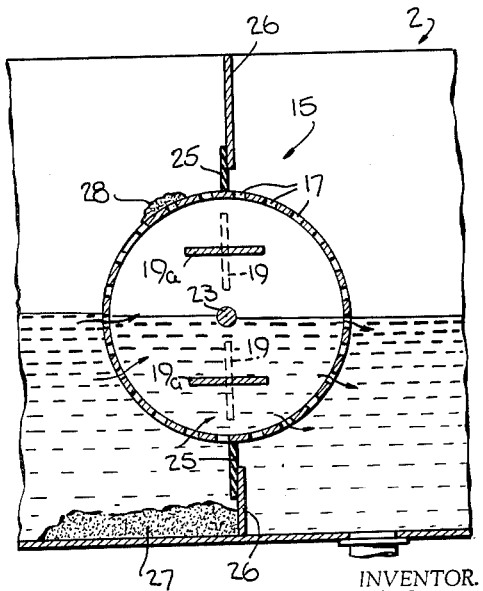
Fig.4.
INVENTOR.
RAYMOND H. PETRETTI
BY
Norman T. Holland
ATTORNEY July 26, 1966　　　R. H. PETRETTI　　　3,262,571
EDUCTION UNIT
Filed May 9, 1963　　　　　　　　　　3 Sheets-Sheet 2
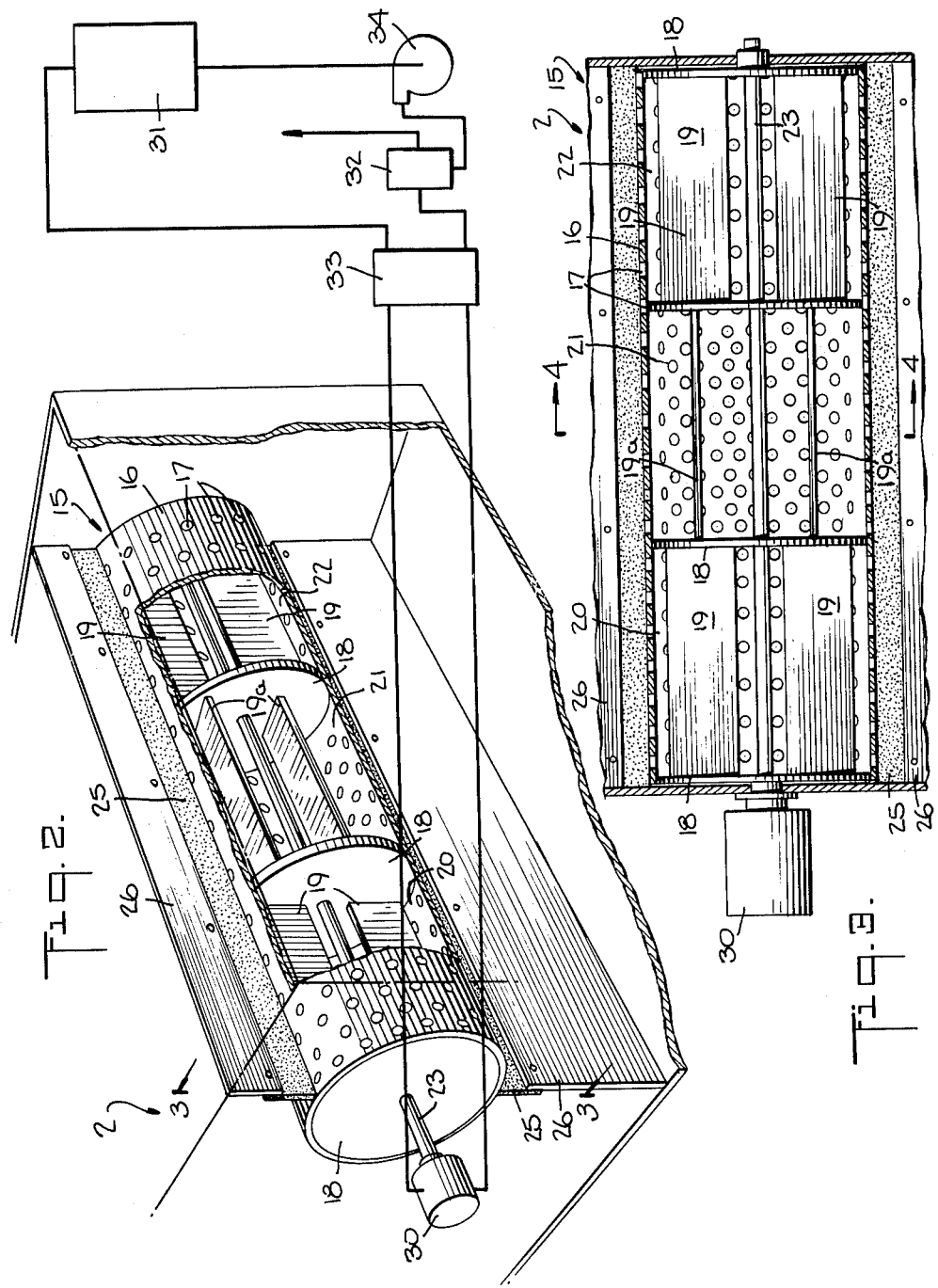
INVENTOR.
RAYMOND H. PETRETTI
BY
ATTORNEY

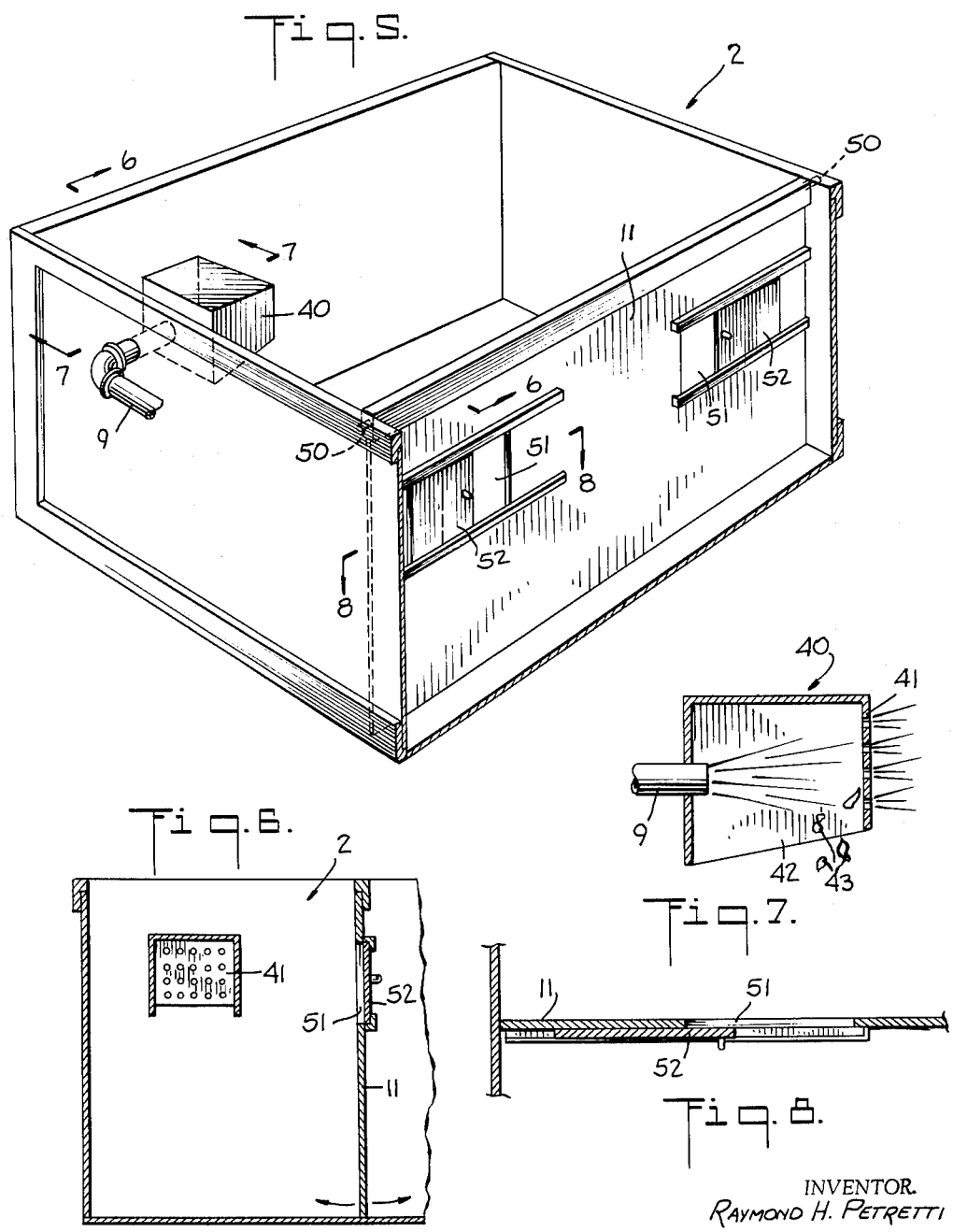

United States Patent Office  
3,262,571  
Patented July 26, 1966

3,262,571  
EDUCTION UNIT  
Raymond H. Petretti, Flushing, N.Y., assignor to Ortem Manufacturing Corporation, Flushing, N.Y., a corporation of New York  
Filed May 9, 1963, Ser. No. 279,190  
12 Claims. (Cl. 210—297)

The present invention relates to an improved eduction unit for draining catch basins and the like and more particularly to an improved filter for an eduction unit which will operate without clogging.

Eduction units operate by sucking up debris mixed with a fluid, such as water, from sewers, catch basins, etc. and depositing the mixture of fluid and debris into a suitable settling tank, preferably mounted on a truck.

In cases where the debris is substantially dry, the eduction unit deposits a fluid into the sewer or catch basin in order to loosen the debris and to mix it with the fluid so that it will be easily sucked up by the eduction unit. The mixture is deposited in the settling tank where the heavier debris falls to the floor. The fluid with the lighter debris in suspension passes through a series of baffles and/or strainers so that the lighter debris is removed from the fluid. The fluid which is now relatively free of debris may be re-deposited into the catch basin and re-used to loosen and mix with additional debris. Thus the fluid is recirculated. An example of such an eduction unit is shown in United States Patent No. 2,010,538 dated August 6, 1935.

The strainers or filters which are presently being used are substantially straight walled with a plurality of openings which permit fluid to pass but filter out the debris. It has been found that the openings in these strainers sometimes become clogged with debris so that fluid cannot pass therethrough and cannot be recirculated. If this occurs, it becomes necessary to open the settling tank in order to clean out the strainer.

The present invention overcomes these difficulties and provides an improved eductor in which the strainer may be easily cleaned without opening the settling tank.

Another object of the present invention is the provision of an improved strainer for the eduction unit which will improve the efficiency of the eduction unit.

Another object of the present invention is the provision of an improved strainer which may be easily and inexpensively mounted on existing eduction units.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 1 is a perspective view of a truck having an eduction unit embodying the present invention;

FIG. 2 is a perspective view of the improved strainer of the present invention;

FIG. 3 is a sectional view taken along line 3—3 of FIG. 2;

FIG. 4 is a sectional view taken along line 4—4 of FIG. 3;

FIG. 5 is a perspective view of another feature of the present invention;

FIG. 6 is a sectional view taken along line 6—6 of FIG. 5;

FIG. 7 is a sectional view taken along line 7—7 of FIG. 5; and

FIG. 8 is a sectional view taken along line 8—8 of FIG. 5.

Referring to the drawings, a truck 1, usually called an eductor truck because it embodies an eduction unit, comprises a settling tank 2 and a front cab 3. The truck 1 is provided with the usual eduction mechanism generally designated by the reference numeral 4. The eduction mechanism 4 comprises a pressure pipe 5 having a jet nozzle 7 mounted on its lower end adapted to force a fluid, such as water, into a catch basin 6. A discharge hose 8 is adapted to remove the mixture of debris and fluid from the catch basin 6 and to deposit it into the settling tank 2 through a discharge pipe 9. A separate fluid pipe 10 may be used to loosen any debris along the side walls of the catch basin 6, if desired or necessary.

A filter box 40 is mounted in front of the discharge pipe 9 within the settling tank 2. The filter box 40 has a screen 41 at its front end and an opening 42 at its lower end. The top and sides are preferably closed. Thus when the mixture first enters the settling tank 2 the solid material, such as pieces of wood 43, will be stopped by the front screen 41 and will fall down through the bottom opening 42.

The settling tank 2 is also provided with one or more baffle plates 11. Each baffle plate 11 (FIGS. 5 to 8) is mounted to swing on a pivot 50 and has one or more openings 51 therein. The openings 51 are adapted to be adjusted by doors 52 slidably mounted on the pivotally mounted baffle plate 11. With this structure the heavier debris will fall to the bottom of settling tank 2 and the lighter debris in suspension will be carried by the fluid through the openings 51. As pointed out above the openings 51 may be adjusted by the slidable doors 52 to regulate the flow of the fluid therethrough.

A strainer unit 15 is also provided to remove the lighter debris from the fluid before the fluid is passed through the pressure pipe 5 to be re-used.

The improved strainer unit 15 of the present invention comprises a drum 16 having a plurality of perforations 17 therein. The drum 16 comprises a plurality of spaced circular plates 18 which are held together by a plurality of fins or connecting members 19 and 19a.

The preferred embodiment shown in the drawings utilizes four spaced plates 18 to divide the drum 16 into three compartments 20, 21 and 22. However, it will be understood that the number of plates 18 may vary as may be desired. Furthermore, the fins 19 in compartments 20 and 22 are shown as being at right angles to the fins 19 in compartments 20 and 22. However, it will be understood that the fins 19 and 19a may assume any desired position without departing from the invention. In addition, while the drawings show a pair of fins 19 or 19a in each compartment, the number of fins used may be changed, if desired, without departing from the invention.

The drum 16 is mounted on a shaft 23 journalled in the side walls of the settling tank 2, so that it may be rotated. A pair of scraper blades 25, each mounted on a plate 26 located above and below the drum 16 are in contact with the periphery of the perforated drum 16. The blades 25 are preferably made of a suitable resilient material such as rubber or the like, and are adapted to clear any debris from the openings 17 in the drum 16.

With this structure the mixture of debris and fluid is deposited at the rear of the settling tank 2 and passes forwardly through baffles 11 and drum 16. The heavy debris 27 drops to the bottom of the tank 2 and the lighter debris in suspension passes through the adjustable openings 51 in baffles 11 and the openings 17 in the drum 16. The drum 16 will filter the finer debris from the fluid and permit the fluid to pass through openings 17.

If the openings 17 in the drum 16 become clogged by debris, such as debris 28, the drum 16 is rotated in one direction or the other direction or may be rotated both back and forth. In this manner the scraper blades 25 and the fins 19 will loosen any debris 28 to clear the openings 17 and permit the fluid to pass through. If desired, the drum 16 may be rotated at predetermined intervals to prevent the openings 17 from becoming clogged.

When the settling tank 2 is to be cleaned out, the baffle 11 is swung on pivots 50 to permit the debris to be removed.

Preferably hydraulic means may be used for rotating the drum 16 and the hydraulic fluid is preferably obtained from the same source that operates the eduction unit. As shown in the drawings such hydraulic means comprise a two-way motor 30 mounted at the end of shaft 23 and operated by fluid from a main source 31 which is preferably the same source that operates the eduction unit. A selector 32 is adapted to direct fluid from main source 31 to either the eduction unit or the drum-rotating motor 30. A valve 33 is adapted to supply fluid to either side of two-way motor 30 to rotate the drum in either direction and the usual pump 34 is used to force the fluid through the lines. In this manner power for rotating the drum 16 is obtained from the same hydraulic source 31 which operates the eduction unit.

It will thus be seen that the present invention provides an improved eductor in which the strainer may be easily cleaned without opening the settling tank and which provides a more efficient operation. It will also be noted that the simplicity of the rotating drum easily permits it to be mounted on existing eduction units.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. An eduction unit comprising a settling tank, means for removing a mixture of debris and fluid from catch basins, and for depositing said mixture in said settling tank, rotatable filtering means for filtering said mixture, said filtering means having openings therein, and means for rotating said filtering means alternately in opposite directions to clear said openings.

2. An eduction unit comprising a settling tank, means for removing a mixture of debris and fluid from catch basins, and depositing said mixture in said settling tank, a filtering drum having openings therein rotatably mounted on said eduction unit for filtering said mixture and means for rotating said filtering drum in opposite directions to clear said openings.

3. An eduction unit comprising a settling tank, power means for operating said eduction unit, means for removing a mixture of debris and fluid from a catch basin and depositing said mixture into said settling tank, a hollow filtering drum having openings in its periphery and mounted on said unit for filtering said mixture, said drum having a plurality of spaced plates to form compartments, said plates being connected by flat fins in each compartment, the fins in adjacent compartments being substantially at right angles to each other, means for rotating said filtering drum to clear it, and wherein power to rotate said drum is obtained from the same source that operates said eduction unit.

4. An eduction unit comprising a settling tank, power means for operating said eduction unit, means for removing a mixture of debris and fluid from a catch basin and depositing said mixture into said settling tank, a hollow filtering drum having openings in its periphery and mounted on said unit for filtering said mixture, said drum having a plurality of spaced plates to form compartments, said plates being connected by flat fins in each compartment, the fins in adjacent compartments being substantially at right angles to each other, means for rotating said filtering drum to clear it, and wherein said drum is rotated alternately in opposite directions.

5. An eduction unit comprising a settling tank, means for removing a mixture of debris and fluid from catch basins, a discharge conduit for depositing said mixture in said settling tank, filtering means for filtering said mixture, said filtering means comprising a rotatable filtering drum in said settling tank, a filter box on the inside of the settling tank and facing said discharge conduit, said filter box having a screen and an open bottom and a baffle pivotally mounted in the tank and having adjustable openings therein.

6. An eduction unit comprising a settling tank, means for removing a mixture of debris and fluid from a catch basin and for depositing said mixture in said settling tank, at least one separator in said settling tank to divide said settling tank into compartments, said separator having an opening therein, a rotatable filter drum mounted in the opening in said separator and substantially filling said opening, said filter drum having openings therein and being rotatable relative to said plate, whereby said mixture flows from one compartment to another through said filter drum and means for rotating said filter drum to clean said openings.

7. An eduction unit as claimed in claim 6 wherein separator comprises a scraper mounted thereon adapted to engage the periphery of said filter drum.

8. An education unit as claimed in claim 6 wherein said filter drum is adapted to be rotated in opposite directions.

9. An eduction unit as claimed in claim 6 wherein said drum has a plurality of spaced plates to form drum compartments and wherein said plates are connected by fins in each compartment.

10. An eduction unit as claimed in claim 9 wherein fins in adjacent drum compartments are substantially perpendicular to each other.

11. An eduction unit as claimed in claim 6 wherein a conduit is provided to deposit said mixture in said settling tank and a filter box is mounted within said settling tank in front of said conduit, said filter box is provided with a screen at the front and an opening at the bottom.

12. An eduction unit as claimed in claim 6 wherein a baffle plate is pivotally mounted in said settling tank and has an adjustable opening therein.

References Cited by the Examiner

UNITED STATES PATENTS

| | | | |
|---|---|---|---|
| 123,663 | 2/1872 | Anderson | 210—540 |
| 550,353 | 11/1895 | Parker | 210—402 X |
| 898,212 | 9/1908 | Gaara et al. | 210—396 X |
| 1,311,639 | 7/1919 | Cartwright | 210—153 |
| 1,331,239 | 2/1920 | Cartwright | 210—416 X |
| 1,344,710 | 6/1920 | Otterson | 210—241 |
| 1,437,008 | 11/1922 | Otterson | 210—241 |
| 1,567,033 | 12/1925 | Caps | 210—258 X |
| 2,010,538 | 8/1935 | Evans | 210—241 X |
| 2,022,118 | 11/1935 | Loeb | 210—540 |
| 2,303,491 | 12/1942 | Otterson | 210—359 |
| 2,520,327 | 8/1950 | Nilson | 210—402 X |
| 2,602,549 | 7/1952 | Peterson | 210—402 X |

FOREIGN PATENTS

| | | |
|---|---|---|
| 7,635 | 1902 | Great Britain. |
| 56,266 | 3/1936 | Norway. |
| 81,476 | 3/1953 | Norway. |

REUBEN FRIEDMAN, *Primary Examiner.*

D. M. RIESS, *Assistant Examiner.*